June 7, 1960 M. GEORGES 2,939,219
DRAFTING SCALE
Filed Sept. 28, 1955
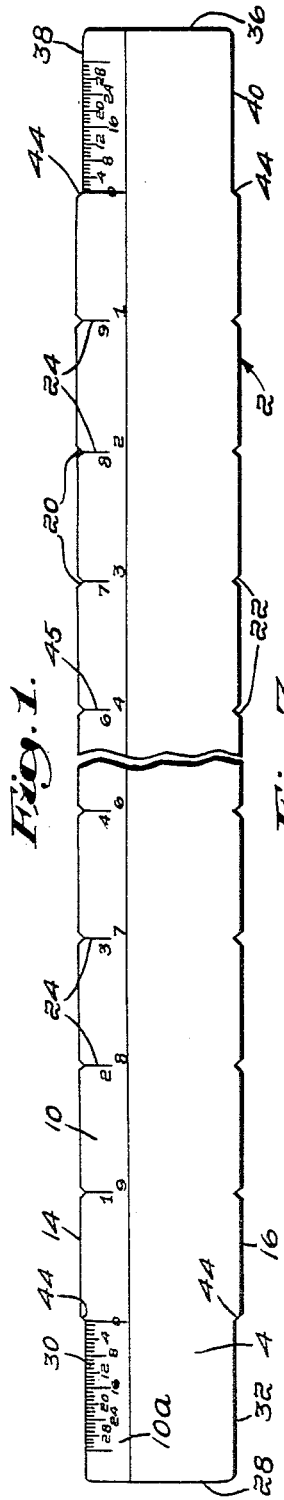
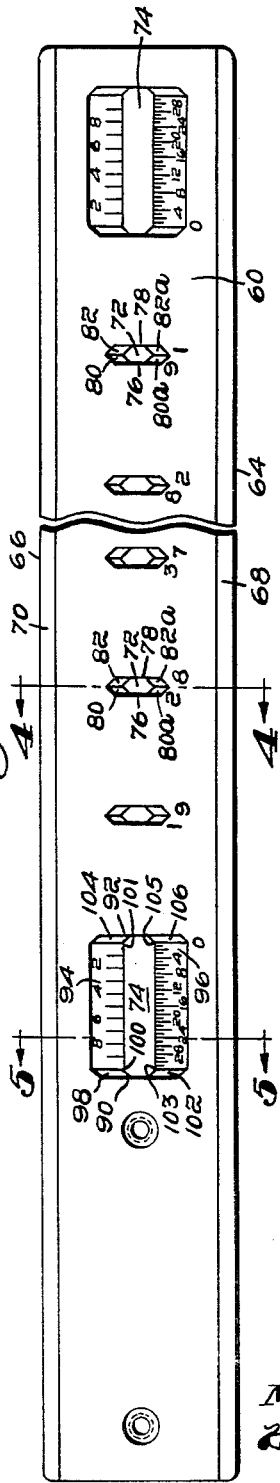
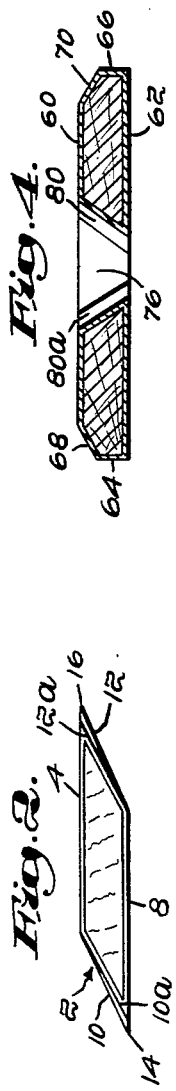
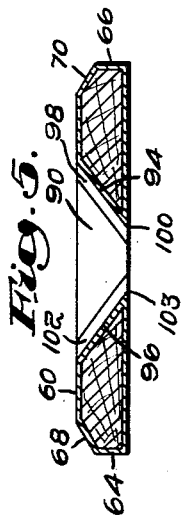
Inventor:
Michael Georges,
by Yardley Chittick
Attorney

United States Patent Office 2,939,219
Patented June 7, 1960

2,939,219
DRAFTING SCALE

Michael Georges, 29 Hawthorne St., Norwood, Mass.

Filed Sept. 28, 1955, Ser. No. 537,194

2 Claims. (Cl. 33—107)

This invention relates to open divided drafting scales and more particularly to an improved scale adapted to facilitate rapid and accurate measurements by draftsmen.

Conventional scales are usually provided with continuous straight edges having markings or graduations according to either the English or metric system, or both. While the markings on such scales are laid off with great accuracy, and are available in any desired sub-division, as, for example, quarters, sixteenths, sixty-fourths, etc., nevertheless the accuracy and speed with which measurements may be laid off is controlled to a large extent by the care exercised by the draftsman in positioning his pencil. It is quite easy to mark off a measurement to one side or the other of a desired marking and thereby introduce an error. In drawings laid off to a small scale, a small error in measurement represents a large error when projected to the actual scale of the object or part illustrated in the drawings prepared by the draftsman.

Accordingly it is an object of this invention to provide a scale having notches therein for facilitating accurate positioning of the draftsman's pencil.

Other objects and many of the attendant advantages of this invention will be readily appreciated as the same becomes better understood by reference to the following detailed description when considered in connection with the accompanying drawings, wherein:

Fig. 1 is a plan view of a preferred form of scale constructed according to the present invention;

Fig. 2 is an end view looking to the right in Fig. 1;

Fig. 3 is a plan view of a modified form of scale constructed according to the present invention;

Fig. 4 is a transverse section taken along line 4—4 of Fig. 3; and,

Fig. 5 is a transverse section taken along line 5—5 of Fig. 3.

It is to be understood that scales constructed according to the present invention may be provided with indicators or markings representing units of measurement in the English or metric system. The general construction of the scales in either system will be the same.

Referring now to Figs. 1 and 2, there is illustrated a scale 2 beveled along its sides to correspond in cross section to a parallelogram. The top and bottom surfaces of the scale are identified by numerals 4 and 8. The beveled sides are identified by numerals 10 and 12. The lower and upper longitudinal measuring straight edges are identified by numerals 14 and 16 respectively. In general, a scale having a cross section of a parallelogram is described as an opposite bevel scale. However, in addition to the aforesaid conventional basic shape, the scale of Figs. 1 and 2 has certain additional unique structural features provided according to the present invention. Whereas the longitudinal measuring straight edges of a conventional flat or opposite bevel scale are uninterrupted, the upper and lower straight edges 14 and 16 of the scale of Figs. 1 and 2 have a plurality of identical V-shaped notches or indentations 20 and 22 along its upper and lower straight edges respectively. The vertex or point of each of the notches 20 coincides with one of the graduations or markings 24 indicating specific units of length based on the English system of measures. In the present illustration graduations 24 represent inches and the two sets of numerals 1–9 running in reverse order indicate the number of inches as measured from the zero reference points at either end of the scale. While not shown, it is to be understood that similar graduations are provided on the bottom beveled side 12 of the scale for use with notches 22.

In addition to the notches, the scale is reduced in width in the regions from the left hand end 28 to the first or left hand zero reference point, thereby producing short straight edges 30 and 32 offset slightly from straight edges 14 and 16 respectively. This reduction in width may be achieved by beveling or shaving sides 10 and 12 to produce short sides 10a and 12a. Similar short straight edges 38 and 40 are provided at the opposite end 36 of the scale. The points marked off or measured from the short offset straight edges are to be in line with the points marked off or measured by the notches 20 and 22. The ends of straight edges 14 and 16 are cut at an angle to form short guide surfaces 44, or edges similar to one side of notch 20 which meet the shorter straight edges 30, 32, 38 and 40 at the zero reference points. The angle of the short guide surfaces is determined experimentally so that when an average drawing instrument point is inserted for the purpose of making a mark as a point of measurement, then the mark produced corresponds as accurately as possible to the zero point of the scale. Furthermore, this mark, as explained above, will also be in alignment with the marks made by the drawing instrument point when placed in the notches.

Set off along each of the short offset straight edges are a series of graduations representing with respect to the zero reference points fractions of the units of measurement set off along straight edges 14 and 16. In the illustrated embodiment the smallest graduations along the short straight edges are set off in increments of 1/32 inch. The short offset straight edges are not notched for the reason that the graduations are too close to each other and also to aid in marking off measurements which fall in between the graduations of the particular scale being used. However, because the short edges are offset to be substantially aligned with the vertices of notches 20 and 22, any fractional measurement set off by the draftsman's pencil will be in line with measurements set off at notches 20 and 22, assuming that in each case the draftsman places the point of his pencil close against the scale.

The improved scale of Figs. 1 and 2 greatly facilitates the task of marking off measurements. If, for example, it is desired to measure off six inches, the draftsman need merely set his pencil against guide surface 44 and the adjacent short straight edge to mark off his zero point, and then moves the pencil to the notch coinciding with the marking labeled 6 at 45 to mark off the desired distance. The notches serve to locate the pencil exactly at the correct point and thus relieve the draftsman of the need for looking very closely to make sure that his pencil is centered exactly.

Another manner of use is as follows: If a first point or vertical line has been established on the drafting surface near the left margin, for example, and it is desired to measure off 6½ inches to the right of the established point or line the left hand short straight edge is placed so that the ½ inch mark is in alignment with such point or line and the pencil is then placed in the six inch main notch to complete the measurement.

If the established point or line is near the right hand margin then the right hand short straight edge is used and the measurement is made from right to left. For the foregoing reasons, the inclusion of two small straight edges, one at each end of the line of notches increases the usefulness of the scale.

The principles of this invention are also applicable to other forms of scales. In Figs. 3 to 6, for example, there is shown a modified form of scale providing a straight edge so it can be used with drafting machines. This is a regular straight edge without the usual bevelled edge of the customary scale which cuts into the pencil.

It will be understood that the scales of Figs. 1 and 3 might be made of a thin strong material such as steel in which case, the notches being of such small vertical dimension would not require that the edges of the scale be bevelled. However, considering the thickness of the scales disclosed herein, bevelled edges are preferred.

The scale shown in Figs. 3 to 6 generally comprises top and bottom surfaces 60 and 62, vertically disposed side surfaces 64 and 66, and beveled surfaces 68 and 70 forming the top and side surfaces. Formed in the body of the scale are a plurality of openings of two types identified by the numerals 72 and 74. Openings 72 are six-sided, being larger in a lateral direction at the top side 60 of the scale than they are at the bottom side 62. The longitudinal dimension of opening 72 is the same at the top and bottom sides of the scale. Otherwise, in a horizontal plane, the general shape of opening 72 is the same at both top and bottom. Each opening 72 is defined by two vertical surfaces 76 and 78 running parallel to each other in a lateral or transverse direction, and four surfaces 80, 82, 80a and 82a. Each of the latter four surfaces lies in non-parallel planes which are also non-parallel or oblique relative to the top, bottom and vertical sides of the scale. Surfaces 80 and 82 are exact mirror images of surfaces 80a and 82a respectively. The lower edges of surfaces 80 and 82 define a V-shaped notch, and the lower edges of surfaces 80a and 82a do the same. These V-shaped notches are functionally the same as notches 20 and 22, acting to facilitate positioning of the draftsman's pencil. The reason for making surfaces 80, 82, 80a and 82a slope laterally inward of the sides of the scale, as viewed in Fig. 3, is to provide for the fact that the end of the draftsman's pencil is conical, increasing in diameter from the extreme tip. If surfaces 80 and 82 were vertical, it would be difficult to position the tip of the pencil in the vertex of the notch formed by the lower edges of the two surfaces. This difficulty is obviated by sloping the two surfaces 80 and 82. Moreover, if the two surfaces were vertical, it would be difficult to see the vertex of the notch defined by the lower edges of surfaces 80 and 82. With the illustrated construction there is no such problem. Each of the openings 72 is so located that the vertices of the notches formed by the lower edges of its oblique sloping sides are predetermined distances from the corresponding vertices of the other identical openings, as, for example, distances of one inch as shown.

To allow for fractional measurements two openings of the type identified by the numeral 74 are shown. These openings are positioned at each end of the series of openings 72 and correspond in function to the reduced end sections of the embodiment of Fig. 1. Openings 74 consist of 8 surfaces so arranged that the top and bottom ends of the openings are similar in shape, having the same longitudinal dimensions but different lateral dimensions. The openings decrease in width going from top to bottom. Each opening 74 consists of two vertical transversely extending sides 90 and 92 which, as seen in Fig. 5, are trapezoidal in shape. Running in a longitudinal direction are two inclined sides 94 and 96 rectangular in shape. These sides bear marking and numerals indicative of fractions of the distance between each of openings 72. Between sides 90 and 94 is an inclined side 98 of parallelogram shape. The top and bottom edges of side 98 are parallel and of the same length. The bottom edge of side 98 intersects the bottom edge of side 94 to form a corner 100. The last marking of the fractional scale of side 94 is located at corner 100. Similar parallelogram-shaped sides 102, 104 and 106 are provided as shown in the other three corners. In Fig. 3, the zero reference points of the scales on sides 94 and 96 are located at the corners formed by the lower edges of sides 94 and 96 with sides 104 and 106 respectively. Corner 100 and the three other corners 101, 103, and 105 function like the corners formed by guide surfaces 44 and the short offset straight edge 38 and 40. Corners 101 and 105 are substantially in line with the vertices of the notches formed by sloping sides 80 and 82 and 80a and 82a of openings 72. The distance between corner 100, and corner 101, of opening 74, and the vertices of the notches formed by sloping sides 80 and 82 is, in the present embodiment, equal to an exact multiple of the unit distance between successive ones of said openings 72.

The openings 72 and 74 facilitate rapid setting off of measurements due to the fact that their notches and corners permit accurate positioning of the draftsman's pencil or scriber. The embodiment of Fig. 3 may be utilized apart from the drafting machine, if desired, and, in addition, its principles may be embodied in the scale of Fig. 1, or vice versa, so as to provide a drafting instrument having a plurality of dissimilar scales. By combining the principles of the two embodiments it would be possible, for example, to place indicia based on the English system along the edges of the scale as in Fig. 1 and indicia based on the metric system along the body of the scale as in Fig. 3.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

I claim:

1. An open divided drafting scale comprising a body having therein a plurality of notches spaced according to a measuring system, the bottom terminal ends of the vertices of said notches being substantially in the plane of the under surface of the scale that is to be positioned adjacent the drawing surface, the vertices of said notches being in a straight line and accessible to a drafting instrument applied in vertical position and a short straight edge fixed with respect to said body and commencing at a point marking the beginning of a whole unit of said measuring system, said short straight edge bearing fractional markings to the extent at least of a whole unit of said measuring system, said short straight edge extending away from said notches and being substantially in alignment with the vertices of said notches whereby markings on the drawing surface made by said drafting instrument when placed against one or more of said notches will be in alignment with any marking on the drawing surface appearing adjacent said short straight edge.

2. A drafting scale as set forth in claim 1, in which said short straight edge is connected to said first edge by an obtusely angled guide surface to form a corner for receiving a drafting instrument at a position in alignment with other drafting instruments placed in said notches.

References Cited in the file of this patent

UNITED STATES PATENTS

| | | |
|---|---|---|
| 8,398 | Parsons | Sept. 30, 1851 |
| 1,249,049 | Eifel | Dec. 4, 1917 |
| 1,728,420 | Little | Sept. 17, 1929 |
| 1,877,341 | Kurtz | Sept. 13, 1932 |
| 2,450,769 | Rothblum | Oct. 5, 1948 |
| 2,554,099 | Ermold | May 22, 1951 |
| 2,579,664 | Gleasman | Dec. 25, 1951 |

FOREIGN PATENTS

| | | |
|---|---|---|
| 342,114 | Great Britain | Jan. 29, 1931 |